Jan. 25, 1949.　　　　　L. H. FIRENG　　　　　2,460,169
DOUBLE-CUT EDUCATIONAL NOVELTY
Filed April 17, 1946　　　　　　　　　　　2 Sheets-Sheet 2

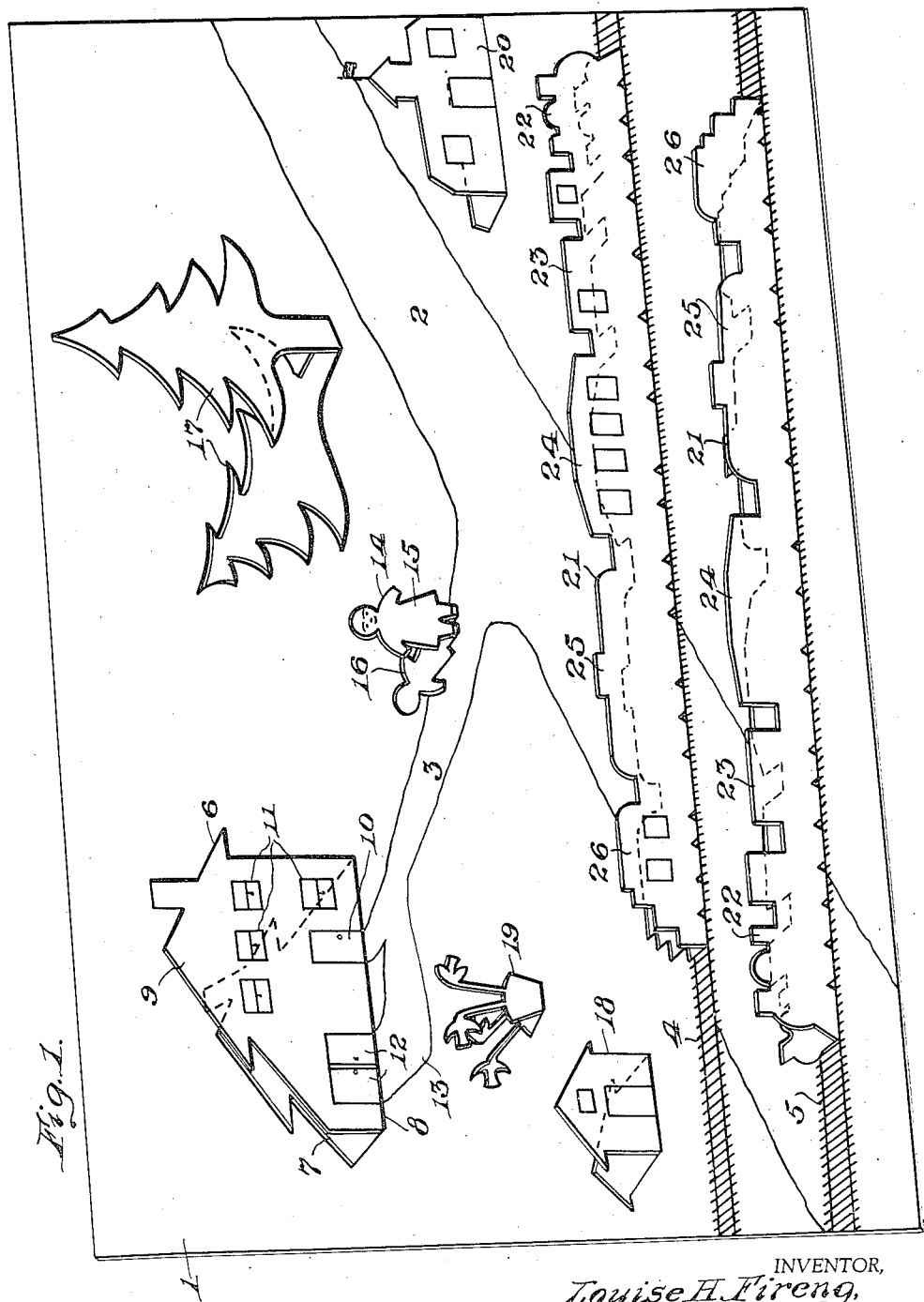

INVENTOR,
Louise H. Fireng,
BY J. Stuart Freeman,
Attorney.

Patented Jan. 25, 1949

2,460,169

UNITED STATES PATENT OFFICE

2,460,169

DOUBLE-CUT EDUCATIONAL NOVELTY

Louise Harris Fireng, Wayne, Pa.

Application April 17, 1946, Serial No. 662,713

4 Claims. (Cl. 35—35)

The object of the invention is to provide improvements in educational novelties, and especially in those adapted for teaching children of kindergarten and first grade ages the names of things encountered in everyday life.

One of the primary factors in the education of children of tender years is the enlargement of their vocabularies, the relationship of well known objects to one another, and the adjectives, verbs and adverbs by which such relationships are visualized and registered upon the minds of the children, although the words used are not as yet labelled as particular parts of speech.

Another object is to provide paper or pasteboard cutouts representing well known objects, in such construction that in one position the cutouts represent merely enough details of the object in question to identify it, while the same cutout in another position is provided with color and markings which cooperate with its silhouette to bring out its characteristic details, as hereinafter set forth by way of illustration.

Still another object is to provide cutouts having the shapes of letters and words, so that continuous arrangement or association of such cutouts will result in indicating the word or words that define the details of a given object.

Figure 6:
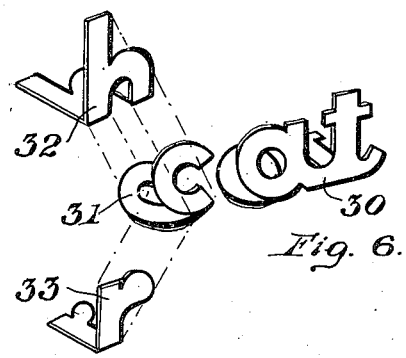
Figure 7:
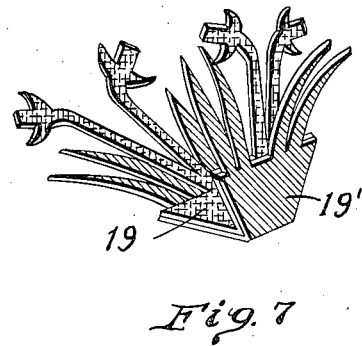
Figure 4:
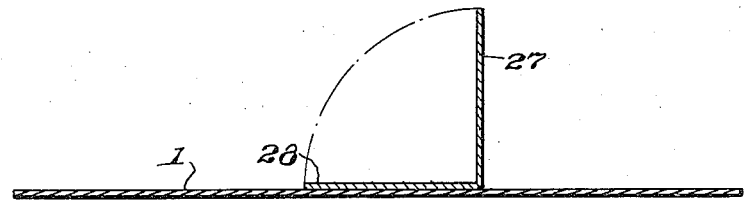
Figure 5:
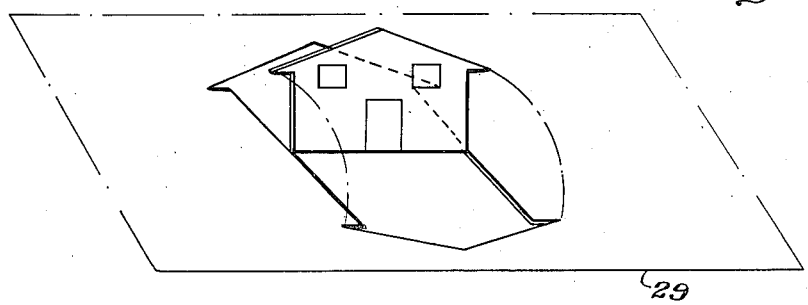
Figure 3:
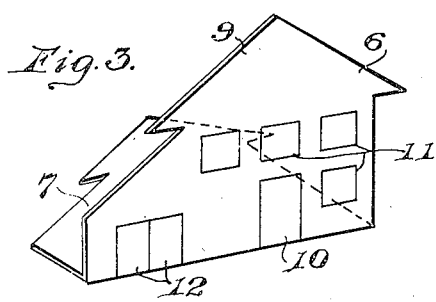
Figure 2:
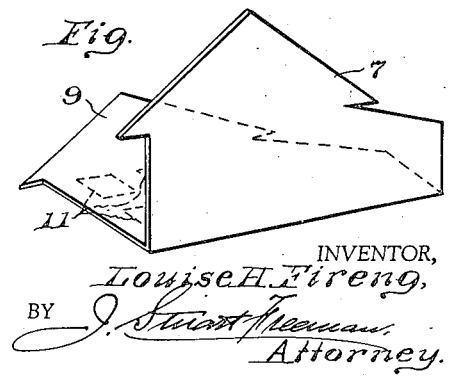

With the objects thus very briefly stated, the invention comprises further details of construction and operation, which are hereinafter fully brought out in the following description, when read in conjunction with the accompanying drawings, in which Fig. 1 is a plan view of a board suitably marked and upon which a plurality of different types of cutouts are arranged to illustrate the invention and the manner in which it is practiced as an educational device; Fig. 2 is a perspective view of a two-sectioned cutout, the upstanding half of which represents merely the outline or silhouette of a simple type of dwelling with an attached garage; Fig. 3 is a similar view of the same cutout, but reversed so that its other half shows suggested sizes and arrangement of windows, entrance door and garage doors, which can be used as a suggested plan for marking the first-mentioned half from memory, and even coloring said first or second halves by more advanced students; Fig. 4 is a vertical transverse section showing the position of a two-halved cutout when operatively positioned upon the base board, with either one or the other of the two halves in upstanding position; Fig. 5 indicates how the two-part cutouts may be initially supplied as a part of a larger disc, sheet or board, properly scored so as to make it possible to readily remove them from such disc, sheet or board; Fig. 6 shows how letter-shaped cutouts can be arranged and rearranged in order to indicate the simplicity with which the more simple words are built up from a relatively small or brief letter combination, and Fig. 7 is a perspective view showing two of the cutouts used together and in contrast specifically to represent a potted plant with foliage.

Referring to Fig. 1, there is here shown a board 1 upon which a few basic lines are printed or drawn in order to give to the child an idea of a possible arrangement of road or highway 2, private walk or driveway 3 and a pair of parallel railway tracks 4 and 5. Upon this board at the end of the private walk is positioned a residence-indicating cutout 6, the blank or silhouette half 7 of which lies upon said board and serves as a base, from a scored medial line 8 of which the other detail-carrying half 9 of the cutout rises, with its door 10 in natural registry with the walk 3, and windows 11 shown with shades half raised, and its garage doors 12 in registry with a branch 13 of the walk or drive 3.

In said walk or drive, a child-representing cutout 14 may be positioned to suggest a child at play, its detailed half 15 being substantially upright, and its silhouette half 16 serving as its base support. Likewise upon the lawn to one side of the house or residence may be positioned one or more tree cutouts 17, it being noted that in each instance the upstanding portion of the cutout is of the same shape as that which serves as a base support, while one or both of the two halves may be marked and/or colored in detail, while the second half if so marked may be of different color or design, or if preferred, a second folded sheet may be inserted of contrasting color or shape which bears some definite relation with the first folded sheet, as long as the same or similar outline is concerned. In the present case, a smaller playhouse cutout 18 is shown upon the opposite side of the walk or drive from the tree 17, while one or more potted plants 19 may be present upon the lawn, either singly or in flowerbed arrangement and association. In the case of flowers and plants, one half of the cutout may be detailed as to representative type of color, while the other half if left blank may be used as a silhouette upon which a child may mark its idea or memory of the flower's colors as in water colors, crayon or similarly. Additional cutouts, such as that representing a school 20, may be placed upon the board, first by the teacher as a suggested arrangement, and thereafter by each child as an expression of his individuality of thought. Fig. 7, for instance, shows the aforesaid potted plant cut-out 19 as yellow in color having an insert cut-out 19' therein to represent the foliage, green in color.

The tracks 4 and 5 may be used as lines upon which to position one or more train cutouts 21, which may be of different shape, but which in the present case are similar in that the same types of rolling stock are shown in the same sequence, but whereas the cutout on track 5 has its upstanding half portion identified merely as to outline of its engine 22, tender 23, coach 24, tank car 25 and rearmost car 26, the other cutout upon track 4 is arranged so as to show more of the details of each of the engine, cars, etc., the other half of each train cutout in each instance serving as a base support, as in the case of cutouts hereinbefore described, and as indicated by Fig. 4, wherein an upstanding half cutout 27 is operatively positioned by its other half 28 serving as a supporting base. These cutouts may be provided in the first instance as pre-cut elements, or may be separated by the child from a previously scored card 29, as indicated by Fig. 5.

Referring to Fig. 6 there is here suggested an infinite number of ways in which cutouts of simple words, syllables and letters can be used to teach even more advanced students spelling and the like. Merely as illustrating the many ways in which this phase of the invention can be employed, a cutout 30 of the letters "a" and "t," properly joined, is shown as a basic word or syllable, before which can be placed cutouts 31, 32 or 33, which represent respectively the letters "c," "h" and "r," and which when positioned before the letters "at" spell the somewhat longer words "cat," "hat" and "rat" in turn. Likewise, suffix letter cutouts may be employed, which taken with the base word alone, or with one or other prefix make still other and longer words, and so on without limit.

This brief description and representative drawings merely illustrate in the most simple terms the vast number and extent of the arrangements by which the invention can be used to teach the names, appearance and arrangement of objects in general to a child, so that it is obvious that said invention is in no wise limited by the few and simple objects here shown.

Having thus described my invention, what I claim and desire to protect by Letters Patent of the United States is:

1. A cut-out of the class described comprising a plurality of pairs of angularly related halves of the same object, said pairs being joined at a base line, and each of said halves being of such area that it may serve as a substantially horizontal supporting base for the other half.

2. A cut-out according to claim 1, wherein the halves of the related pairs are of contrasting shape.

3. A cut-out according to claim 1, wherein the halves of the related pairs are of contrasting color.

4. A cut-out according to claim 1, wherein the halves of the related pairs are of contrasting hue.

LOUISE HARRIS FIRENG.

REFERENCES CITED

The following references are of record in the file of this patent:

UNITED STATES PATENTS

| Number | Name | Date |
| --- | --- | --- |
| 575,731 | Powers | Jan. 26, 1897 |
| 969,309 | Tuck | Sept. 6, 1910 |
| 1,231,059 | Pente | June 26, 1917 |
| 1,419,882 | Meyers | June 13, 1922 |
| 1,587,354 | Radford | June 1, 1926 |
| 1,668,428 | Shope | May 1, 1928 |
| 1,997,446 | Bigelow | Apr. 9, 1935 |
| 2,191,041 | Protz | Feb. 20, 1940 |
| 2,293,441 | Meyer | Aug. 18, 1942 |